United States Patent [19]
Terhune et al.

[11] Patent Number: 5,674,393
[45] Date of Patent: Oct. 7, 1997

[54] OIL FILTER

[75] Inventors: Ralph Terhune, 1205 Sherwood La., Broken Arrow, Okla. 74011; Gerald Branchcomb, Sapulpa, Okla.

[73] Assignee: Ralph Terhune, Broken Arrow, Okla.

[21] Appl. No.: 696,199

[22] Filed: Aug. 13, 1996

[51] Int. Cl.$^6$ .................................................. B01D 27/06
[52] U.S. Cl. ..................... 210/315; 210/440; 210/443; 210/493.2; 210/493.5; 210/497.2; 55/498; 55/521
[58] Field of Search .................................. 210/440, 443, 210/444, 493.1, 493.2, 315, 493.5, 497.01, 497.2; 55/500, 521, 498

[56] References Cited

U.S. PATENT DOCUMENTS

| 3,361,260 | 1/1968 | Buckman | 210/493.1 |
| 3,467,256 | 9/1969 | Humbert, Jr. et al. | 210/440 |
| 3,567,023 | 3/1971 | Buckman et al. | 210/440 |
| 3,988,244 | 10/1976 | Brooks | 210/493.1 |
| 5,078,877 | 1/1992 | Cudaback et al. | 210/440 |
| 5,342,511 | 8/1994 | Brown et al. | 210/440 |

FOREIGN PATENT DOCUMENTS

840757  7/1960  United Kingdom ................ 210/493.1

*Primary Examiner*—W. L. Walker
*Attorney, Agent, or Firm*—William S. Dorman

[57] ABSTRACT

A filtering device comprising a cylindrical housing having an upper open end and a lower closed end, an outer annular pleated filter element located within the housing adjacent the wall of the housing and an inner pleated filter element mounted concentrically within the outer filter element, the inner filter element being provided with a central open area, a disk extending across the open end of the housing and having inlet openings communicating with the upper end of the outer filter element, a barrier for preventing the outer pleat edges of the inner filter element from penetrating into the spaces between the inner pleat edges of the outer filter element, the disk having an outlet which communicates with the inner filter element, whereby dirty oil can flow through the inlet openings into outer triangularly shaped spaces in the outer annular filter element downwardly to the lower end of the housing and into the annular open area, from the open annular area into inner triangularly shaped spaces of the inner filter element, through the inner filter element and into outer triangularly shaped spaces of the inner filter element and upwardly to the upper end of the housing and out through the outlet opening in the disk. Alternatively, the oil can pass from outer triangularly shaped spaces of the outer filter element, through the outer filter element itself and into the inner triangularly shaped spaces of the outer filter element and upwardly to the space above the inner filter element and out through the outlet opening.

3 Claims, 7 Drawing Sheets

OIL FILTER

BACKGROUND OF THE INVENTION

1. Field of the Invention

The present invention relates to a filter having a housing within which is mounted a plurality of annular pleated filter elements. More particularly, this invention pertains to the manner in which the filter elements cooperate with one another to produce the desired filtering action.

2. The Prior Art

The present invention is particularly an improvement over Branchcomb U.S. Pat. No. 5,104,534. The Branchcomb patent describes a pair of filter elements formed with helical pleats as one distinction over the prior art wherein the pleats were generally straight. In the present invention, at least one of the elements is provided with straight pleats, but a barrier is provided on the inside diameter of the outer element to prevent interdigitating between the adjacent filter elements. Further distinctions between the present invention and the Branchcomb patent will appear hereinafter.

Preliminary searches were conducted on the invention disclosed herein, and the following listed patents were uncovered in the searches:

| INVENTOR | PATENT NO. | ISSUE DATE |
| --- | --- | --- |
| McMichael | 3,189,179 | 06/15/65 |
| McLaren | 3,752,321 | 08/14/73 |
| Hyslop | 3,198,336 | 08/03/65 |
| Buckman | 3,361,260 | 01/02/68 |
| Royer, et al. | 3,334,753 | 08/08/67 |
| Vandersip | 3,420,377 | 01/07/69 |
| Detrick | 3,543,935 | 12/01/70 |
| Suto, et al. | 4,406,787 | 09/27/83 |
| Cuadaback, et al. | 5,078,877 | 01/07/92 |
| Silverwater | 4,783,271 | 11/08/88 |
| Brown, et al. | 5,342,511 | 08/30/94 |
| Pall, et al. | 3,262,564 | 07/26/66 |
| Bremer | 3,270,884 | 09/06/66 |

U.S. Pat. No. 3,189,179 to McMichael is of interest with respect to the provision of adhesive bands 52 around the pleated filter elements. The obvious deficiencies are that this is not a dual filter element, and that the adhesive bands are around the outer portion of the pleated filter.

U.S. Pat. No. 3,752,321 to McLaren teaches the application of adhesive bands around the inner portion of a pleated filter as shown in FIG. 3 of the drawings. Obviously, this is a single element filter rather than having two pleated concentrically disposed filter elements.

U.S. Pat. No. 3,198,336 to Hyslop is of interest with respect to a pleated filter construction having embossments on the pleats to provide spacing between the pleats as shown in FIG. 4.

U.S. Pat. No. 3,361,260 to Buckman is also of interest with respect to this type of arrangement, but in this case we have a concentric filter wherein the pleats on both the inner and outer filter elements are embossed to provide spacing.

U.S. Pat. No. 3,334,753 to Royer, et al. is of interest with respect to the disclosure in FIG. 5 of the drawings showing the filter element having sealed ends as at 40.

U.S. Pat. No. 3,420,377 to Vandersip, U.S. Pat. No. 3,543,935 to Detrick, and U.S. Pat. No. 4,406,787 to Suto, et al. are of interest with respect to concentric filter elements in a single filter housing and having means, in the case of the latter two, of preventing contact between the inner and outer elements.

The remaining patents listed above are not considered to be of sufficient pertinence to require any comments.

SUMMARY OF THE INVENTION

It is an object of the present invention to provide a new and improved filtering device that includes a housing having an inlet and an outlet and a pair of annularly arranged concentric pleated filter elements.

Briefly, the present invention is directed to a new and improved device, commonly referred to as a cartridge filter, for filtering either gases or liquids, although its principle design is intended for use as an oil filter. The cartridge filter includes a housing and an inlet and an outlet and a plurality of pleated filter elements mounted concentrically within the housing.

DETAILED DESCRIPTION OF THE DRAWINGS

Figure 1:
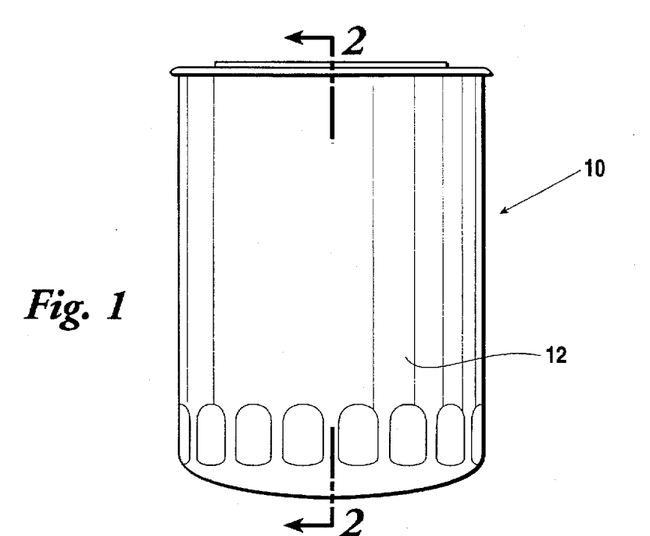
FIG. 1 is a side elevation of the cartridge showing essentially only the outer housing.
Figure 2:
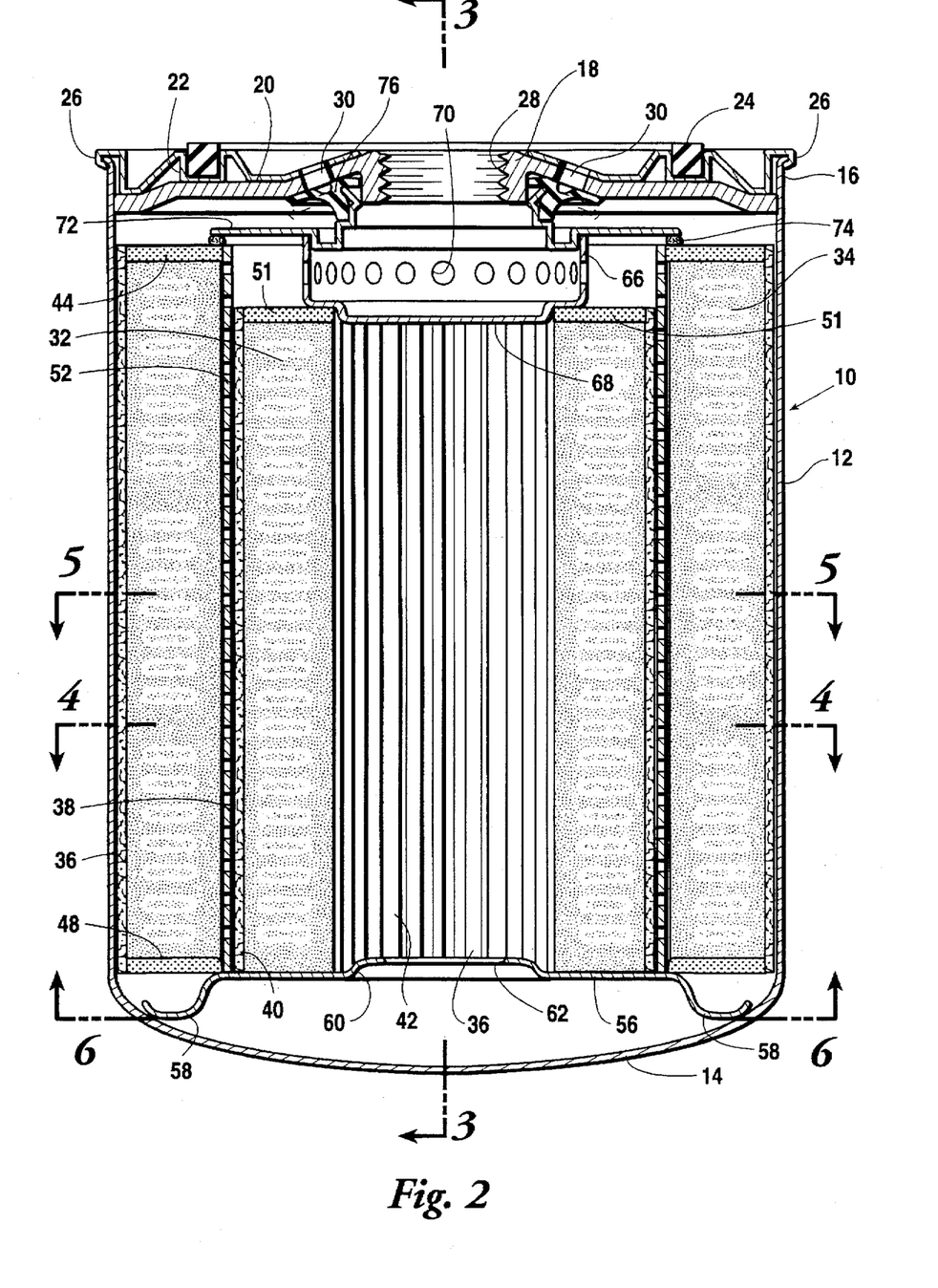
FIG. 2 is a longitudinal sectional view, on an enlarged scale, taken along section line 2—2 of FIG. 1.

Referring to the drawings in detail, FIG. 1 shows a filter cartridge 10 having an outer impervious housing 12 which is closed at its lower end 14, the latter being in the form of a slightly convex shape. The upper end 16 of the housing 12 is open but is closed over by a circular disc 18. Above the disc 18 is a cover plate 20 which is provided with a groove or recess 22 in which is received a circular gasket 24 for a purpose which will hereinafter appear. The outer edges 26 of the cover plate 20 are lapped over the outer upper edges of the housing 12 as shown at 26 in FIG. 2. The center of the disc 18 is provided with a threaded opening 28 which constitutes the discharge port for the filter cartridge 10. A plurality of openings 30 are located in the region between the central opening 28 and the edges of the circular gasket 24. These openings 30 constitute the inlet openings for the filter cartridge 10. When the filter cartridge 10 is used in combination with an automotive vehicle (not shown), for example, the threaded opening 28 can be screwed on to a nipple (not shown) on the crank case of the automobile. When the cartridge is screwed tight, the gasket 24 will be urged against the bottom exterior of the crank case and convenient holes (not shown) in the crank case will communicate with the openings 30 so as to discharge dirty oil from the crank case into the filter cartridge 10.

Figure 4:
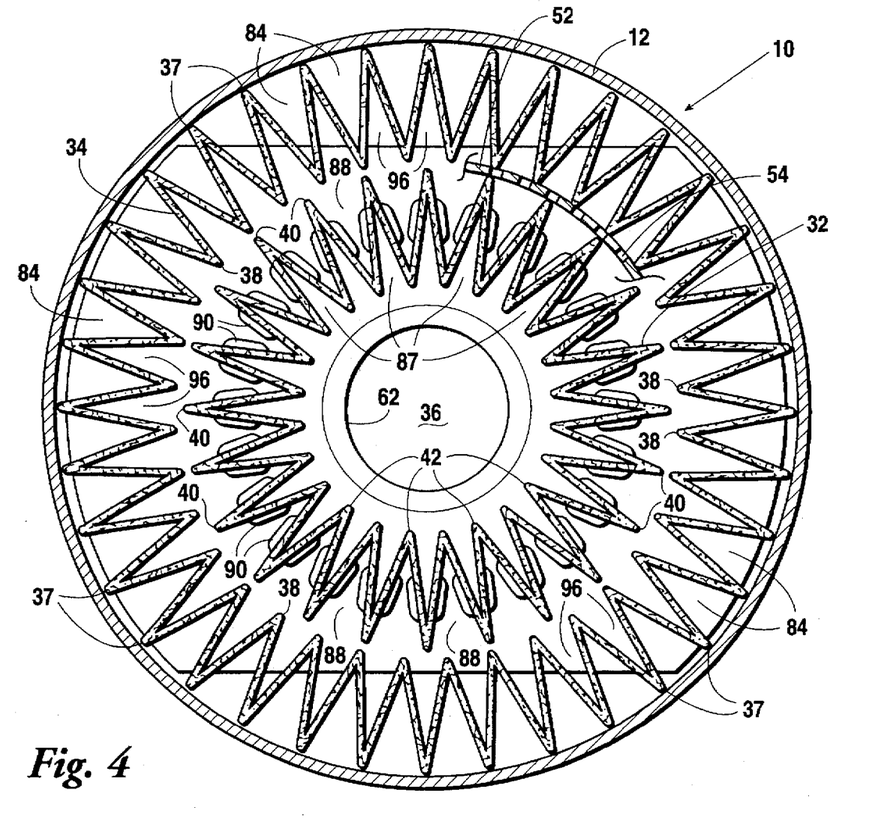
FIG. 4 is a transverse cross-sectional view taken along section line 4—4 of FIG. 2.

Within the filter cartridge 10 is located an internal annular filter element 32 and an exterior annular concentric filter element 34. Within the inner filter element 32 is a central open area 36. Both the interior filter element 32 and the exterior filter element 34 are folded in straight pleats which extend parallel to the longitudinal axis of the filter cartridge 10. Referring now to FIG. 4, the outer filter element 34 is provided with outer pleat edges 37 which abut against the inside of the housing 12 and inner pleat edges 38 which are directed toward but spaced from the inner filter element 32. Similarly, the inner filter element 32 is provided with outer pleat edges 40 which are directed toward but spaced from the outer filter element 34 and inner pleat edges 42 which are directed toward the central annular area 36. As indicated previously, all of these pleated edges extend parallel to the longitudinal axis of the filter cartridge 10.

Figure 5:
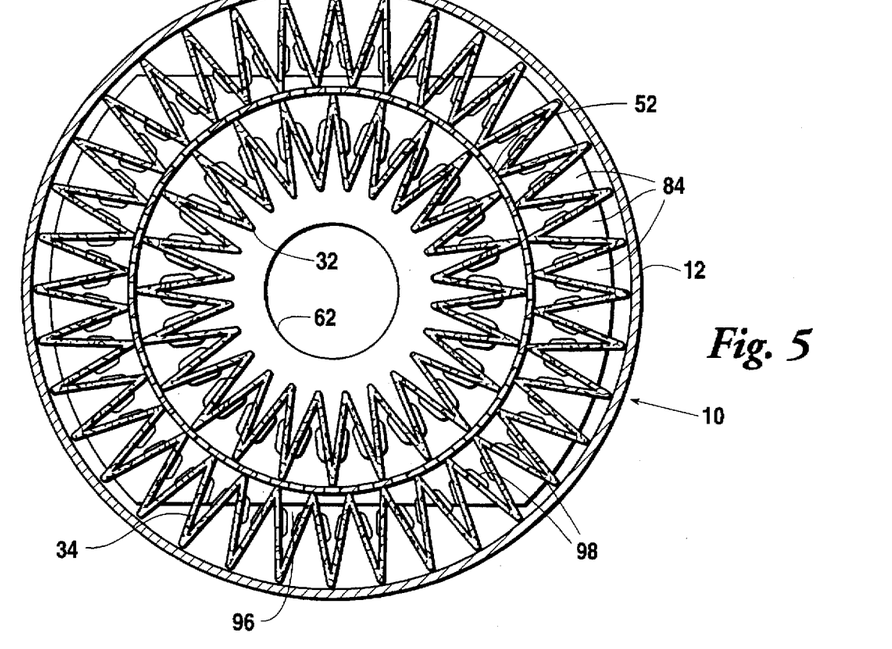
FIG. 5 is a transverse sectional view taken along section line 5—5 of FIG. 2.
Figure 6:
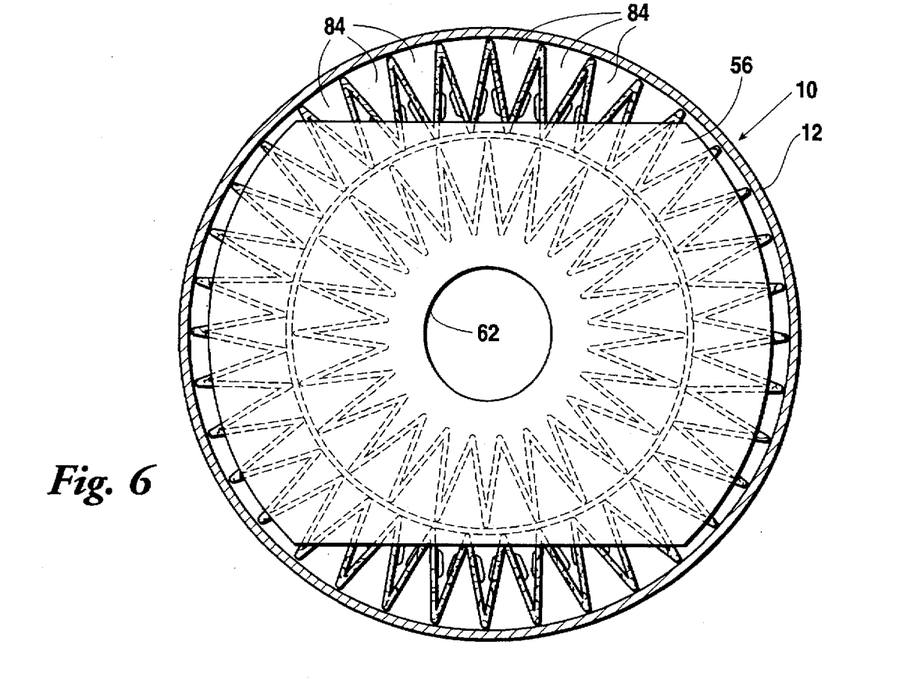
FIG. 6 is a transverse sectional view taken along section line 6—6 of FIG. 2.

The outer filter element 34 is provided with a plurality of triangularly shaped (in cross section) outer spaces 84 between the filter element itself and the inner wall of the housing 12. On the opposite side of the filter element 34 there are a plurality of inner triangularly shaped spaces 96 which face toward the inner filter element 32. A plurality of embossments 98 (see FIGS. 5 & 7) which extend for the full vertical height of the filter element 34 extend from the vertical pleated sides of the filter element into the triangular spaces 96 to prevent the sides of the outer filter element from collapsing toward each other under conditions of flow.

The inner filter element 32 is provided with a plurality of triangularly shaped inner spaces 87 which open into the central annular space 36. The opposite or outer side of the inner filter element 32 is provided with a plurality of triangularly shaped outer spaces 88 which open towards the inner spaces 96 of the outer filter element 34. A plurality of embossments 90 which extend for the full height of the inner filter element extend from the vertical pleated sides of the filter element 32 into the triangular spaces 88 to prevent the sides of the inner filter element from collapsing toward each other under conditions of flow.

Figure 7:
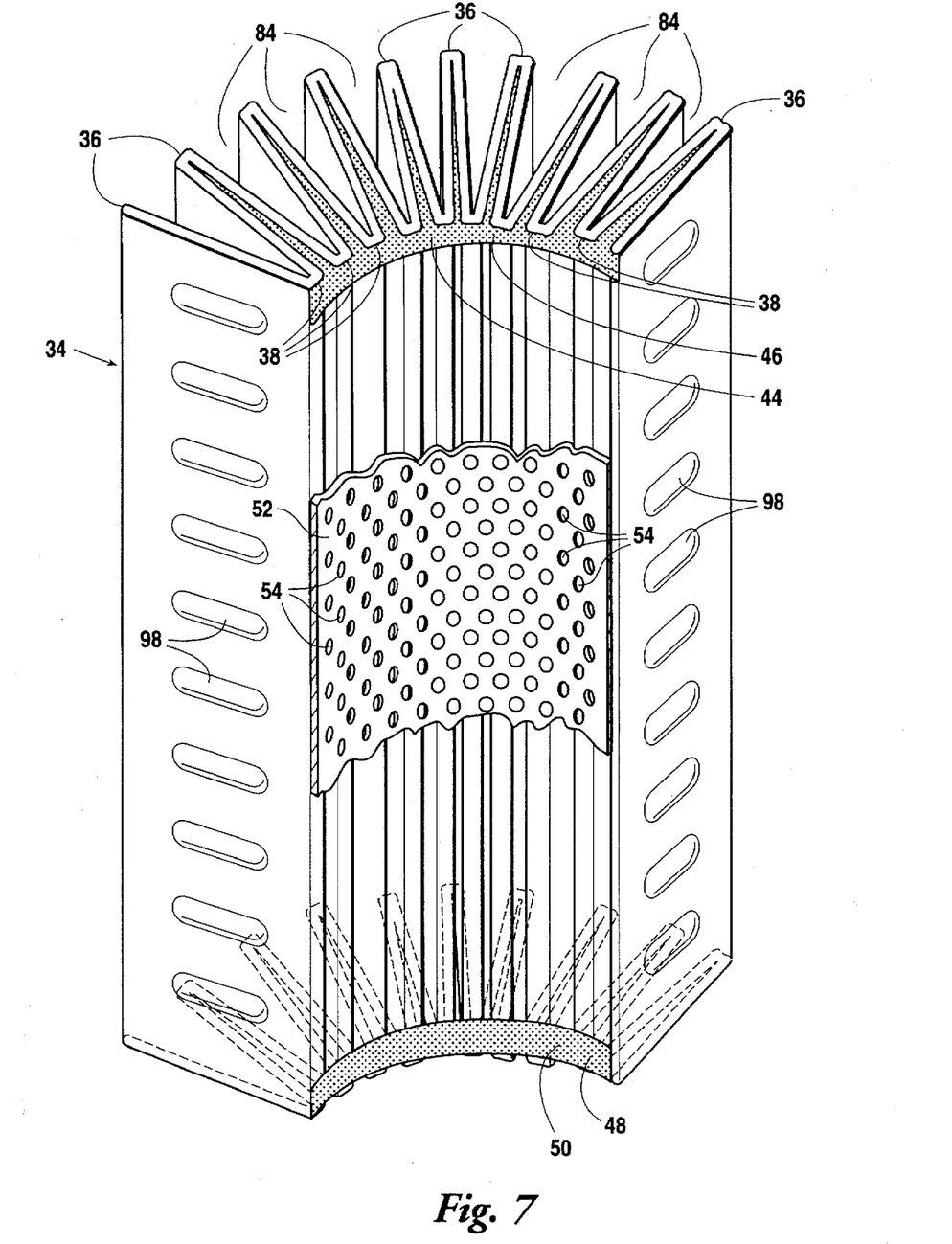
FIG. 7 is a fragmentary and perspective view of a potion of the outer filter element.
Figure 8:
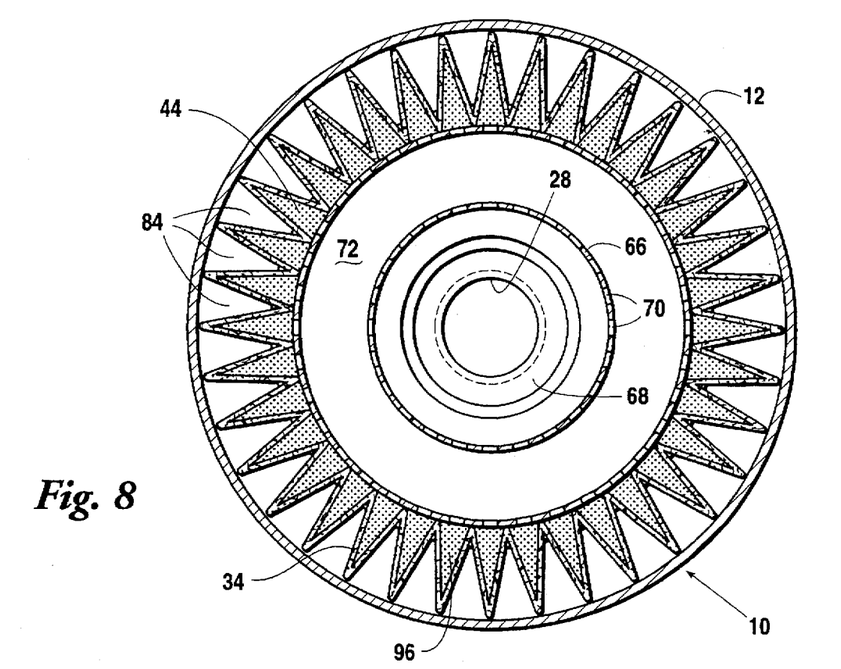
FIG. 8 is a sectional view taken along section line 8—8 of FIG. 3.
Figure 9:
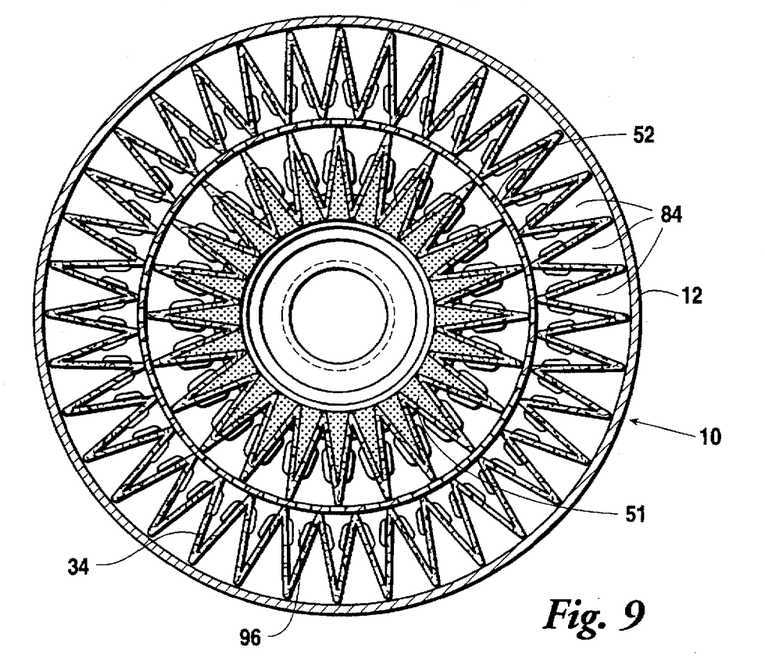
FIG. 9 is a sectional view taken along section line 9—9 of FIG. 3.
Figure 10:
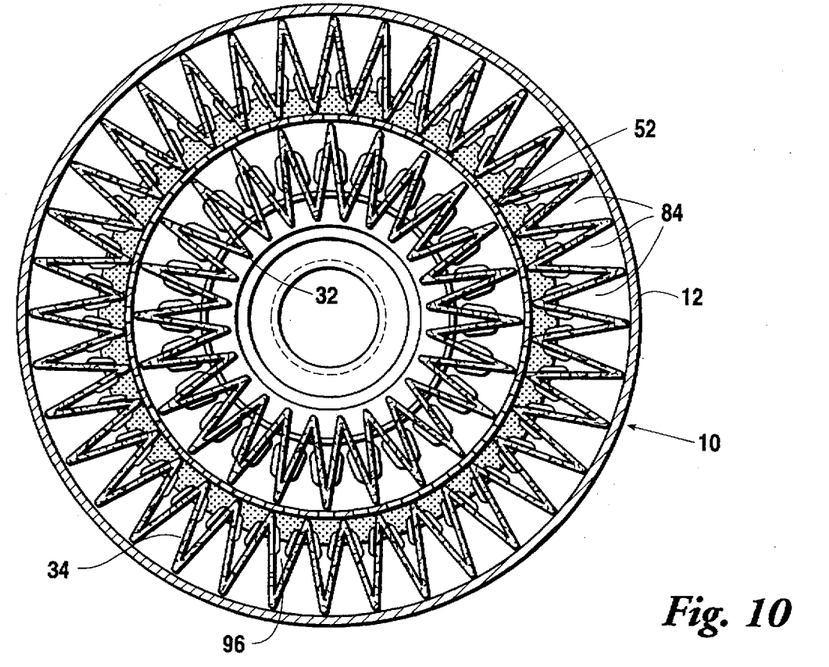
FIG. 10 is a sectional view taken along section line 10—10 of FIG. 3.
Figure 11:
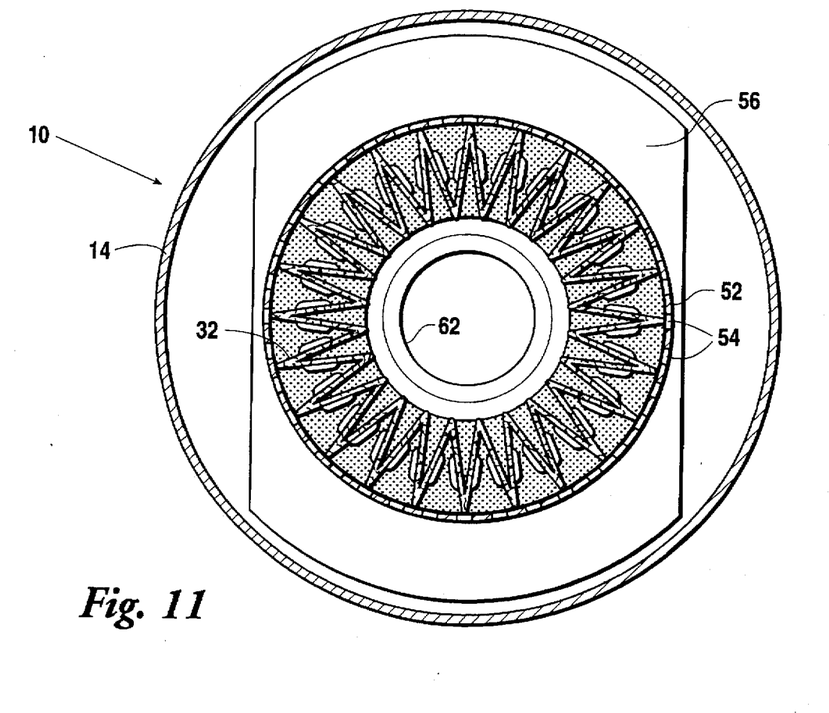
FIG. 11 is a sectional view taken along section line 11—11 of FIG. 3.

For the purpose of providing means to prevent the outer pleats 40 of the inner filter element 32 from going into the spaces between the pleats in the outer filter element 34, a thin perforated barrier 52 of metallic, plastic or stiff paper material is wrapped around the inner filter element 32 so as to be disposed between the two filter elements 32 and 34. The barrier 52 is provided with perforations 54 therein so as to provide communication between the outer spaces 88 of the inner filter element 32 and the inner spaces of the outer filter element 34. FIG. 7 is a perspective view of the outer filter element 34 showing a portion of the barrier 52 (which would be wrapped around the inner filter element 32, not shown) as disposed over the inner pleated edges of the outer filter element.

As best shown in FIG. 7, the upper end of the exterior filter element 34 is sealed off by a layer 44 of adhesive material which extends within the interstices of the pleats and over the upper ends of the inner triangular spaces 96. The layer 44 is provided with an outer rim 46 which projects inwardly towards and against the outer side of the perforated cylinder 52. The same considerations hold true for the bottom portion of the outer filter element 34 in that a lower layer 48 of adhesive which extends within the interstices of the pleats and over the lower ends of the inner triangular spaces 96. The lower layer 48 is provided with an inwardly extending rim 50 which is adapted to project against the outer side of the perforated cylinder 52.

The upper end of the inner filter element 32 is provided with an adhesive layer 51 which extends within the interstices of the pleats and over the upper ends of the inner triangular spaces 87. Also, a cross-member 56 is positioned below the lower end of the inner filter element 32 so as to seal off the lower end. This cross-member 56, as best shown in FIGS. 2, 3, 6 and 11, acts as a spring to urge the inner filter element upwardly. The outer edges of the cross-member 56 are curved as at 58 so as to bear against the inside of the bottom 14 of the housing 12 and to give a spring action upwardly against the lower end of the inner filter element 32, as indicated above. The central portion 60 of the cross-member 56 is indented upwardly so as to project into the inner central opening 36 inside the inner filter element 32. Additionally, this inner projection 60 is provided with an opening 62 which communicates with the inner central opening 36.

Below the disc 18, there is located a short, perforated tube 66 (see FIGS. 2 and 3) which is closed at its lower end 68 so as to cover over the upper end of the inner opening 36. The periphery of the short, perforated tube 66 laps over the inner edge of the inner filter element 32 and bears against the inside edge of the adhesive seal 51 such that the center of the tube 66 closes off the upper end of the central area 36. The outer vertical wall of the member 66 is provided with a plurality of openings or perforations 70, which communicate with the outlet 28 above. The upper end of the short, perforated tube 66 is open, as indicated above, but is provided with an outwardly extending flange 72 which extends from the vertical side edge of the short, perforated tube 66 and to and over the inner edge of the outer filter element 34 in sealing relation with adhesive layer 44. A circular gasket or O-ring 74 can be provided to hold the outer filter element 34 snugly in place between the flange 72 and the lower cross-member 56. The central portion of the flange 72 is provided with an upwardly projecting throat 76 which extends above the center of the short, perforated member 66 and connects with the disc 18 in the region surrounding the lower end of the opening 28.

Figure 3:
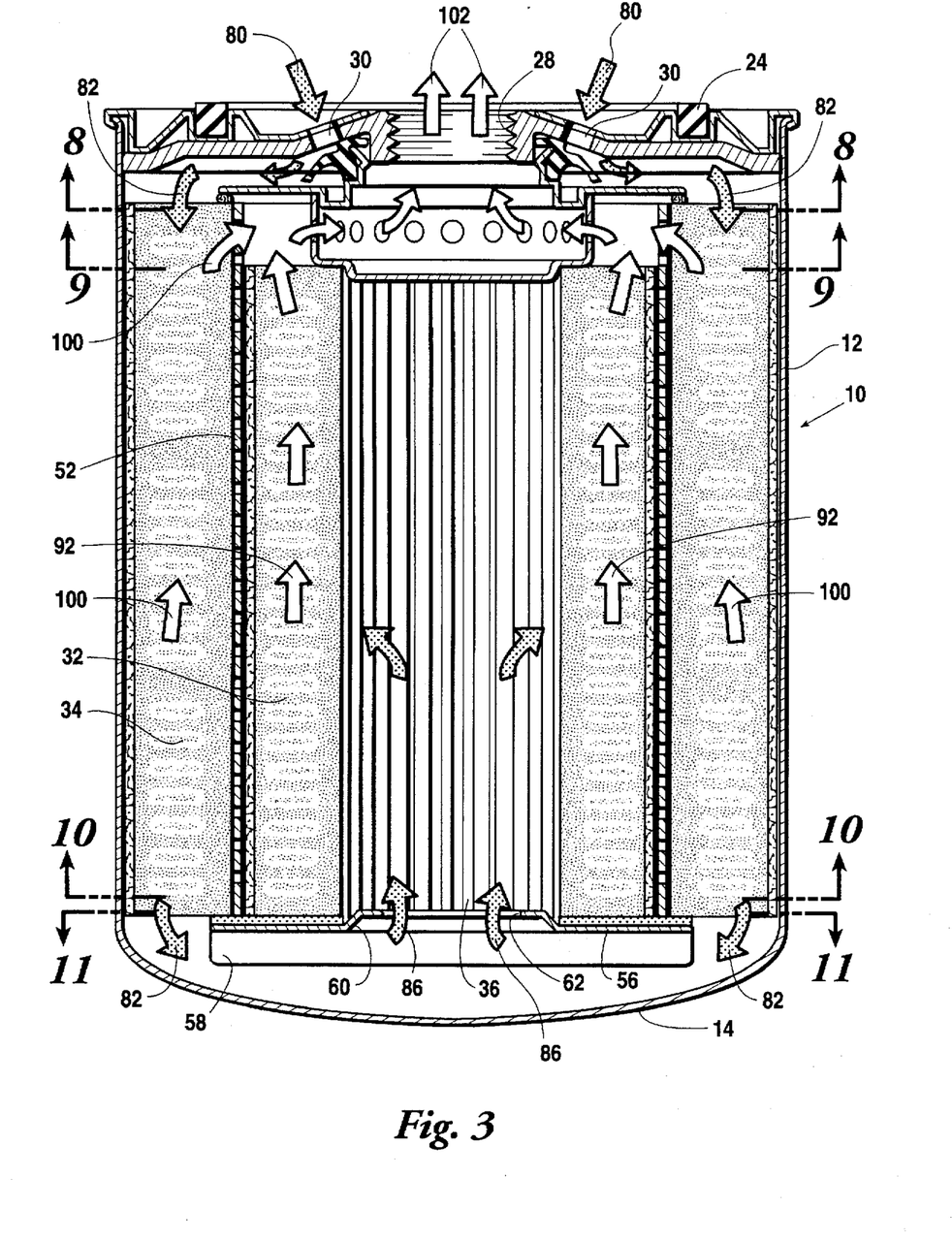
FIG. 3 is a longitudinal sectional view taken along section line 3—3 of FIG. 2.

Turning now to a consideration of FIG. 3, the flow of dirty oil into the inlets 30 and clean oil out of the outlet 28 will now be described. The dirty oil, represented by the stippled arrows 80 passes through the inlet openings 30 and into the area below the disc 18. At this point, the dirty oil represented by the arrows 82 can pass downwardly into the outer open areas 84 (see now FIG. 4) between the pleated members of the outer filter element 34 and beneath the cross-member 56. From here, the dirty oil will flow in accordance with arrows 86 into the central area 36 at which point it can flow only in one direction, that is, into the inner spaces 87 between the pleats of the inner filter element 32, through the filter element 32, and into the outer spaces 88 on the opposite sides of the inner filter element 32.

It should be noted that the inner filter element is provided with a plurality of vertically spaced embossments 90 which are spaced from the top of the inner filter element to the bottom thereof and which are indented in the direction of the flow of dirty oil through the filter elements. When the dirty oil flows through the inner filter element, as described immediately above, then the oil becomes clean oil as indicated by arrows 92 and the clean oil can continue to flow upwardly in the spaces 88 out of the top of the filter element 32 and through the openings 70 in the perforated, short tube 66 and out through the outlet 28.

The oil can also flow from the outer areas 84 on the outside of the outer filter element 34, through the filter element 34 into the inner areas 96 on the inside of the outer filter element 34, through the perforated cylinder 52 and into the open area above the inner filter element 32. At this juncture, it should be noted that embossments 98 are provided on the pleats of the outer filter element also extending from the top to the bottom of this filter element and also indented in the direction of flow of the dirty oil from the outer spaces 84 into the inner spaces 96. When the dirty oil flows through the outer filter element, as described immediately above, then the oil becomes clean oil as indicated by arrows 100 and the clean oil can flow into the area around the perforated, short tube 66. The clean oil represented by the clean arrows 92 and 100 merge as clean oil 102 (arrows) from the outlet 28.

What is claimed is:

1. A filtering device comprising a housing having a cylindrical wall and being provided with upper and lower ends, the lower end of the housing being closed and the upper end of the housing being open, an outer annular filter element located within the housing adjacent the wall of the housing and an inner filter element mounted concentrically within the outer filter element, the inner filter element being provided with a central open area, the outer filter element being provided with outer pleat edges which abut against the wait of the housing and inner pleat edges which are directed toward but spaced from the inner filter element, the inner filter element being provided with outer pleat edges which are directed toward but spaced from the outer filter element and inner pleat edges which are directed toward the central open area, all of the pleat edges extending essentially parallel to the longitudinal axis of the housing, the outer filter element being provided with a plurality of triangularly shaped outer spaces between the filter element and the wall of the housing, the outer filter element being provided with a plurality of inner triangularly shaped spaces between the outer filter element and the inner filter element, the inner filter element being provided with a plurality of triangularly shaped outer spaces which open toward the inner spaces of the outer filter element and being also provided with a plurality of triangularly shaped inner spaces which open into the central annular space, the upper and lower ends of the inner spaces of the outer filter element being sealed, the upper ends of the inner spaces of the inner filter element being sealed, a cross-member positioned between the lower end of the housing and the inner and outer filter elements so as to urge the inner filter element upwardly, the cross-member sealing the lower end of the inner filter element but being provided with an opening which opens into the central annular area, a disk extending across the open end of the housing and being provided with inlet openings communicating with the outer filter element in the space between the upper end of the housing and the upper sealed end of the outer filter element, means for preventing the outer pleat edges of the inner filter element from penetrating into the spaces between the inner pleat edges of the outer filter element, the disk also being provided with an outlet opening which communicates with the space above the inner filter element, whereby dirty oil can flow through the inlet openings into the outer triangularly shaped spaces in the outer annular filter element downwardly and beneath the cross-member and through the opening in the cross-member and into the annular open area, from the open annular area into the inner triangularly shaped spaces of the inner filter element, through the inner filter element and into the outer triangularly shaped spaces of the inner filter element and upwardly to the upper end of the housing and out through the outlet opening in the disk; alternatively, the oil can pass from the outer triangularly shaped spaces of the outer filter element, through the outer filter element itself and into the inner triangularly shaped spaces of the outer filter element and upwardly to the space above the inner filter element and out through the outlet opening.

2. A filtering device as set forth in claim 1 wherein the means for preventing the outer pleat edges of the inner filter element from penetrating into the spaces between the inner pleat edges of the outer filter element comprises a cylinder which is wrapped around the inner filter element so as to be disposed between the outer pleat edges of the inner filter element and the inner pleat edges of the outer filter element, the cylinder being provided with perforations to permit communication between the outer triangular spaces of the inner filter element and the inner triangular spaces of the outer filter element.

3. A filtering device as set forth in claim 1 wherein the inner pleated filter element is provided with a plurality of vertically spaced embossments which extend from the upper end of inner filter element to the lower end thereof and which are indented so as to project into the outer triangularly shaped spaces of the inner filter element and wherein the outer filter element is provided with a plurality of vertically spaced embossments which extent from the top of the outer filter element to the bottom thereof and which are indented into the inner triangularly shaped spaces of the outer filter element.

\* \* \* \* \*